Nov. 7, 1939.   T. W. CLARK   2,179,145
STEAM TRAP
Filed Oct. 25, 1938
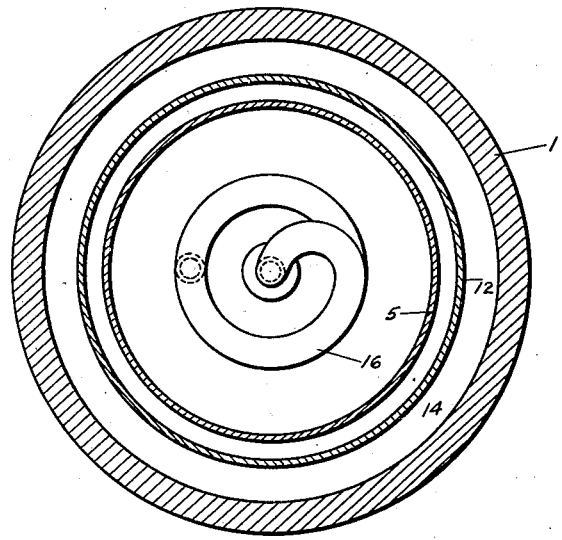
Fig. II
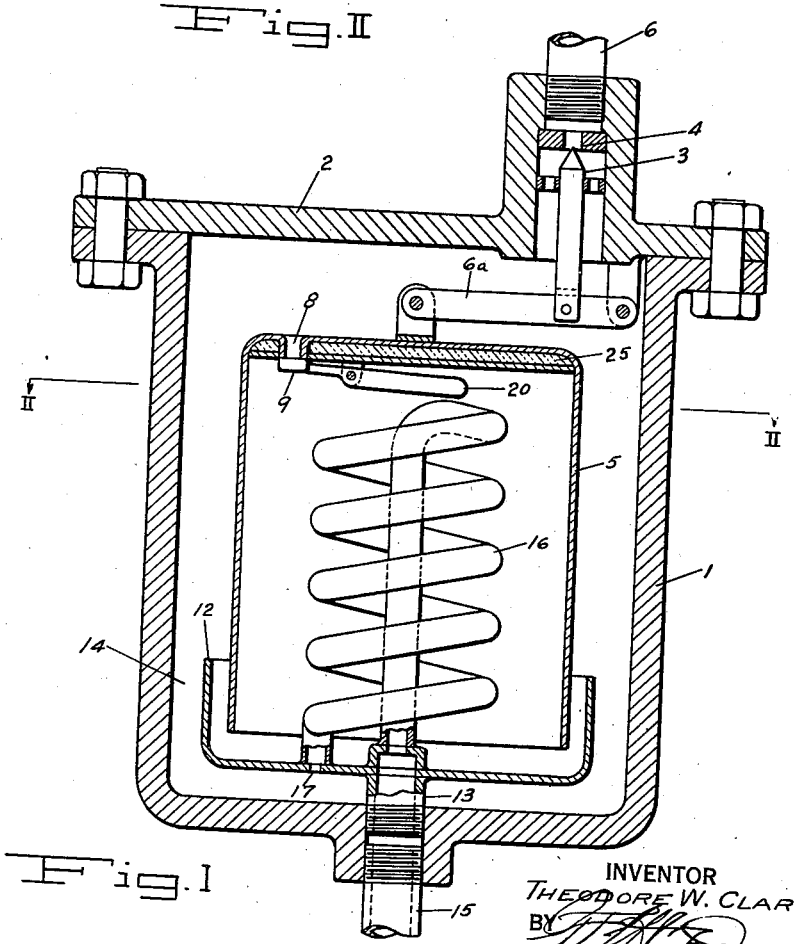
Fig. I
INVENTOR
THEODORE W. CLARK
BY
ATTORNEY Patented Nov. 7, 1939

2,179,145

UNITED STATES PATENT OFFICE 2,179,145

STEAM TRAP

Theodore W. Clark, Portland, Oreg., assignor to Clark Manufacturing Company, Cleveland, Ohio, a corporation Application October 25, 1938, Serial No. 236,906

9 Claims. (Cl. 137—103)

This invention relates to improvements in inverted bucket type steam traps by substituting in these traps a thermal mode of operation for the mechanical mode of operation used in all art traps of this general type.

One of the objects of the present invention is an inverted bucket trap that will not lose its priming and become part of a through passageway for steam, as heretofore happened often with the mechanical trap when it happened to get very hot.

A further object is a trap of the type indicated that by-passes entrained air and noncondensible gases always found in boiler steam, so that they do not cause the trap to become "air-bound", which puts them out of service.

The foregoing and other objects which will be at once apparent to those familiar with these traps constitute the purposes of the present invention, the novel features of which are pointed out in the appended claims.

Drawing forms a part of the disclosure herein, embodying a preferred form of my invention as to the novel features, the old art being in general schematic. While this is the preferred form, I do not wish to limit myself to what is shown but only to what is claimed in the claims.

In the drawing,

Fig. I is a vertical section of a small sized trap intended to be supported by pipe structures to which it is connected; and Fig. II is a section of Fig. I on the line II—II of Fig. I.

In the drawing, 1 is a body provided with the conventional cap 2 with which is incorporated a conventional discharge valve 3 that cooperates with the valve seat 4 by influence of movement applied thereto by the inverted bucket 5, acting to move the lever 6a, to which both the inverted bucket 5 and the valve 3 are pivotally connected.

The inverted bucket moves up or down according to liquid conditions in the body 1 as in the old art. Floating upwardly on account of buoyancy, it closes the valve 3 against the seat 4 and prevents discharge of trap contents through the nozzle 6, for as long as the bucket 5 floats.

In the old art, an open vent or sometimes an adjustable one was provided in substantially the position I have placed the normally closed priming opening 8 and dependence was had on air, steam, noncondensible gas or a combination of them appearing under the bucket in sufficient quantity to satisfy the vent and leave a surplus to make the inverted bucket buoyant when the trap was to close. These conditions were not always possible to correctly meet, though the inverted bucket trap has many virtues notwithstanding and fills a place in the art that no other known trap can fill quite as well in spite of the critical nature of the indispensible vent.

My priming opening 8 is not a vent but is useful for starting the trap when newly installed. If the installer would turn the trap upside down and fill it with water, it is not believed that the priming opening 8 or the normally closed valve 9 therefor would be required at all. It has no operative function during normal operation of the trap.

I use, as stated, the inverted bucket 5 which is old, but I submerge the lower rim of it in the inverted bell 12, which is made rigid with the inside bottom wall of the body 1 by the nipple 13 or some other equally good structure that will hold it in place and provide a space between the bell 12 and the inside bottom of the body 1.

The bell 12 is made somewhat smaller than the inside of the body 1; hence there is an annular space 14 all around it that is in full communication with the space beneath the bell as described and shown in Fig. I.

The body 1 is provided with the conventional inlet opening 15 to which is attached the heating coil 16 that is shown connected to receive the entire quantity of fluid coming in at the inlet 15 through a conduit such as the nipple 13, take it well up into the inverted bucket 5 and finally discharge it through the orifice 17, into the space between the bell and the inside bottom of the body 1. The lower edge of the bucket 5 being submerged and the fluid going towards the discharge valve seat 4 by way of the passage 14, there will be no trapping of air or gases under the bucket, which describes the structure, save for the valve 9.

When the trap is cold and dry, the bucket will drop a short distance below where it is shown and the weighted lever 20 which normally overbalances and closes the valve 9 will be pushed up by the top of the coil 16 or other means for the purpose, to open the valve 9.

We will now assume that the trap is connected to drain a new system and that the first water to reach it is well below the atmosphere boiling point, as it invariably will be.

The valve 9 will be found open and the trap will fill, inverted bucket and all until the water flows out of the connection 6, the trap to all intents being only a part of a conduit.

This condition will persist until trap temperature, inside the bucket 5, gets above the atmosphere boiling point and that outside reaches it, or nearly so. Steam generates inside the bucket and its water content is diminished by the resultant displacement until finally the bucket becomes buoyant enough to float, when the valve 3 closes against the seat 4 and discharge of trap contents is interrupted, causing the pressure therein to rise as the pressure throughout the inside of the trap rises; the flash or steam point also rises and some of the steam under the bucket turns back to water and its buoyancy lessens, finally opening the valve 3 again for another discharge cycle as before, though of course at a higher temperature gradient. The force of operation is thus a thermal one varying bucket buoyancy.

Finally, the water in the trap is all heated so that it is just at or below the flash point for the corresponding pressure, the actual pressure being immaterial to the operating cycle, and it must be appreciated that since all heat comes in through the heater coil 16, the water in the bucket is always the hottest water in the trap and expands into steam first when the valve 3 is opened. This makes it impossible for the trap to become steam bound as the old trap became air bound. What is called "balancing" or middling is completely prevented.

To somewhat tend to increase the thermal difference inside and outside of the inverted bucket 5, I prefer to lightly insulate the top as shown at 25 with a sheet of asbestos-graphite packing or equivalent material suitably retained.

It will be immediately perceived that the former critical condition of balancing the inverted bucket has become much more liberal. Making the bucket heavier, within limits, lengthens the duration of the operating cycle. I do not have to depend on a vent, carefully planned to take care of an expected amount of air and/or gas which may or may not be the quantity that arrives, nor do I find my trap a failure when overheated as it may be when connected to drain superheaters for example. Also I can, if desired, improve the heat balance record of the plant by insulating the trap over its complete outside surface and returning the condensate to the system as is usual, but complete insulation of the current inverted bucket trap is not practiced because it interferes with its operation.

Having fully disclosed the structure and principle governing the operation of my new invention, what I claim as new, is:

1. A steam trap comprising a body provided with inlet and outlet connections, an inverted bucket in said body, an outlet valve controlled by said bucket, a deflector bell made rigid with the lower part of the body in such manner as to submerge the lower portion of the bucket and a heat exchange means connected to the inlet means to extend within the bucket and discharge below the deflector bell.

2. In an inverted bucket type steam trap, an inverted bucket, a trap inlet means positioned to admit fluid to the lower part of the trap and an outlet means positioned to discharge from the upper part of the trap, characterized by a heat exchange means connected to the inlet means and arranged to conduct heat carrying fluid inside the inverted bucket and discharge all fluid outside thereof.

3. In an inverted bucket type steam trap, an inverted bucket, an inverted bell rigidly mounted below the bucket within which the lower open end of the bucket is submerged and means for by-passing the fluid entering the trap so that it does not directly enter the bucket.

4. An inverted bucket type steam trap comprising a body member provided with an inlet opening, an outlet opening and a valve controlling said outlet, an inverted bucket operatively connected to the valve thermal means comprising a heat exchanger connected to the inlet opening and arranged to operate the bucket by heating its contents above the other contents of the trap and discharge means for the heat exchanger arranged to carry all discharge therefrom to a point above the lower edge of the inverted bucket.

5. In an inverted bucket type trap provided with inlet and outlet means, an inverted bucket operatively mounted therein to control trap operation and a heat exchanger connected to the inlet opening and positioned inside of the inverted bucket to carry all fluid from the inlet into and out of the bucket without discharging the same directly under the bucket.

6. In a steam trap of the inverted bucket type, a body, a discharge valve positioned in the upper part of the body, an inlet means positioned in the lower part of the body, an inverted bucket centrally disposed in said body and an inverted bell positioned to normally seal the lower open end of the bucket, characterized by a heating coil positioned within the bucket and connected to the inlet means to carry its entire contents within the bucket and then outwardly to a point outside of the seal of the bucket.

7. In a trap of the character described comprising a body, an inverted bucket within the body, bucket sealing means below the bucket, bucket heating means inside of the bucket and a normally closed priming valve within the bucket arranged to open by contact with the heating means to prime the bucket when the same shall drop by gravity to its lowermost position.

8. A steam trap comprising a body provided with inlet and outlet connections, an inverted bucket in said body, an outlet valve controlled by said bucket, a deflector bell made rigid with the lower part of the body in such manner as to submerge the lower portion of the bucket and a heat exchange means connected to the inlet means to extend within the bucket and discharge outside of the deflector bell.

9. The structure as combined in claim 2 and wherein the discharge from the heat exchange means to a point outside of the bucket is provided with a discharge orifice having less area than the outlet means for the trap.

THEODORE W. CLARK.